Aug. 23, 1949.           L. L. YOUNG           2,479,802
           DIFFERENTIAL DETECTION AND COUNTING
                   OF TRAVELING PULSES
Filed July 23, 1947                    2 Sheets-Sheet 1

Inventor
LARRY L. YOUNG
By Samuel J. Snyder
                Attorney

Aug. 23, 1949.      L. L. YOUNG      2,479,802
DIFFERENTIAL DETECTION AND COUNTING
OF TRAVELING PULSES
Filed July 23, 1947      2 Sheets-Sheet 2
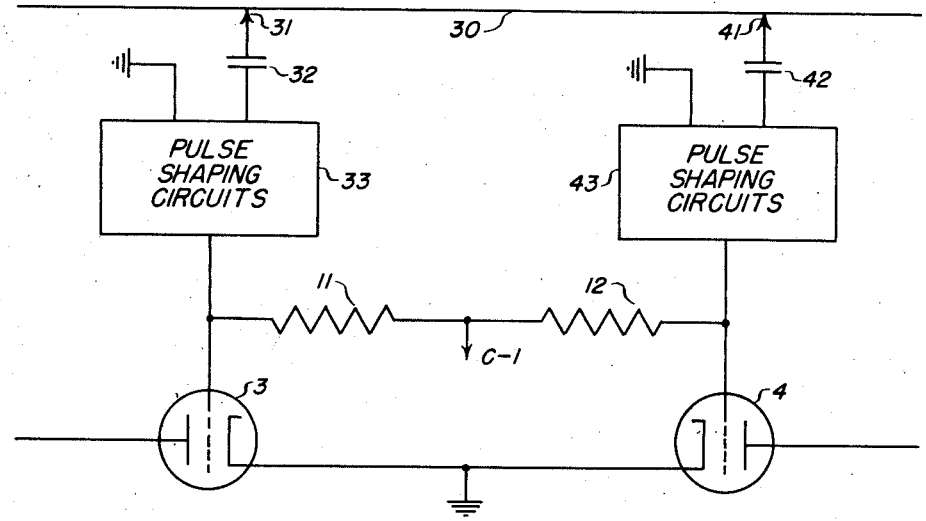
FIG. 4
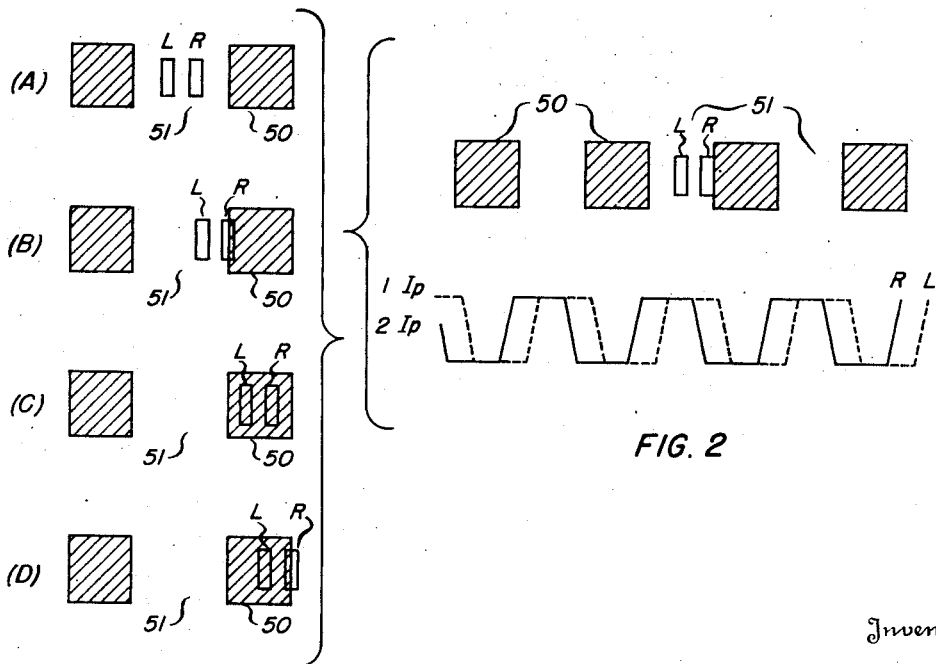
FIG. 3
FIG. 2
Inventor
LARRY L. YOUNG
By Samuel J Snyder
Attorney Patented Aug. 23, 1949

2,479,802

UNITED STATES PATENT OFFICE 2,479,802

DIFFERENTIAL DETECTION AND COUNTING OF TRAVELING PULSES

Larry L. Young, Pasadena, Calif., assignor to Raymond M. Wilmotte, Washington, D. C.

Application July 23, 1947, Serial No. 762,835

12 Claims. (Cl. 250—214)

This invention relates to the detection of travelling fringes, waves, or pulses and their differentiation in accordance with the direction of travel.

The travel of waves or pulses occurs in many instruments. The travel may occur in both directions and the speed of travel or the number of pulses may be so great that it is impractical to use the instrument except for laboratory research. One example of such an instrument is the light interferometer. The interferometer has been used for measuring the lengths of bars, such as the standard meter. In making a measurement with the interferometer a very large number of fringes must be counted. These fringes may move in both directions as the mirror is adjusted to its proper position. It is an object of my invention to reduce the work and time required to make measurements so that instruments such as the interferometer can be economically used in industry.

It is another object of my invention to provide a wave or pulse detector that differentiates between travel of the waves or pulses in one direction from the other direction.

It is another object of my invention to provide a method and means of obtaining the resultant number of waves or pulses and the direction in which they have travelled.

It is a further object of my invention to provide a means of detecting and counting the number of energy pulses moving in both directions in a channel.

The invention will be fully understood from the following description and the drawing in which:

Fig. 2 is a diagram illustrating the operation of a portion of the circuit shown in Fig. 1.

Fig. 3 is a diagram showing progressive phases of the operation of a portion of the circuit, and Fig. 4 shows an embodiment of my invention adapted to detect the passage of electrical waves or pulses.

Figure 1:
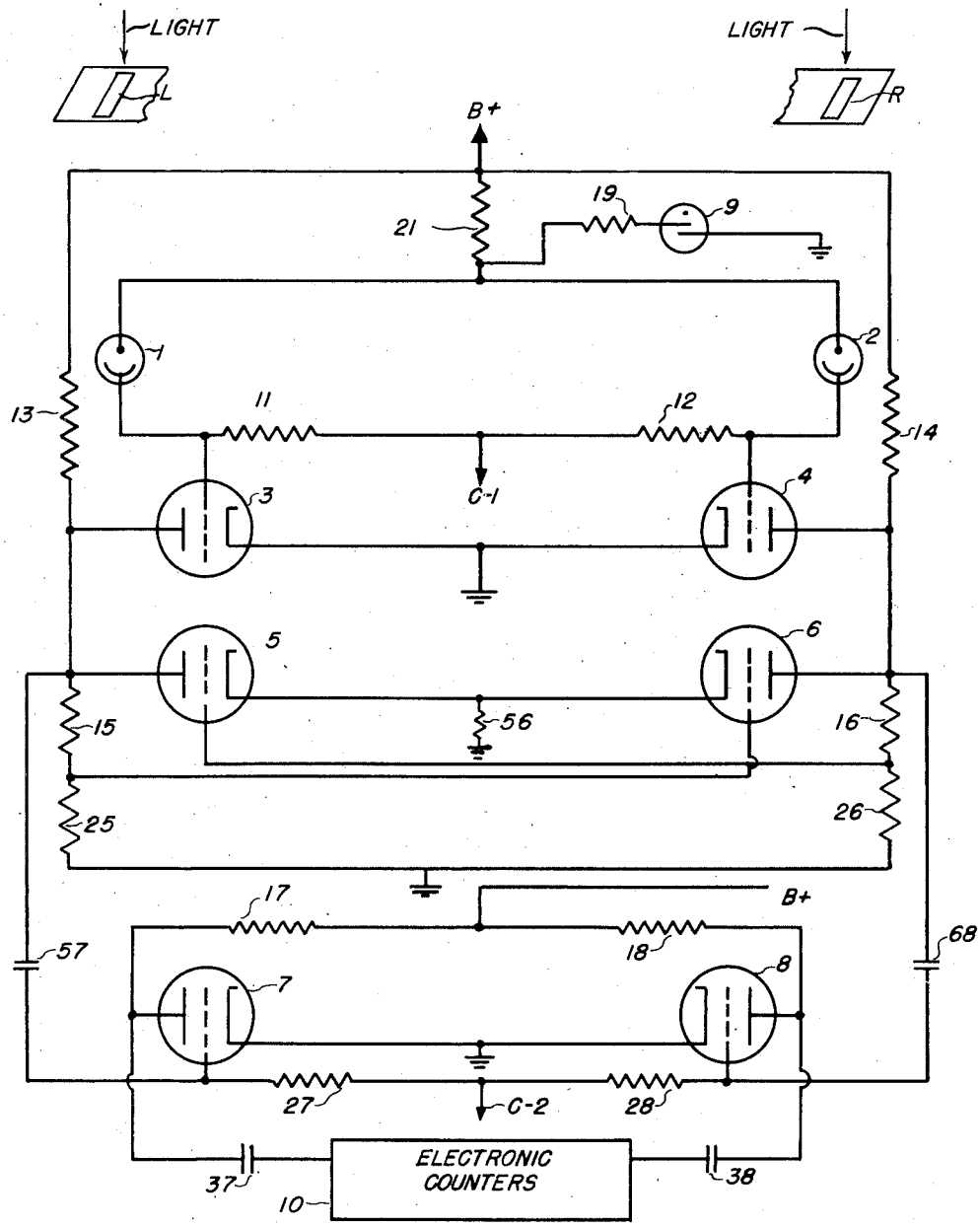
Fig. 1 is a circuit diagram of the essential elements of one embodiment of my invention.

The invention will first be described with reference to the detection of light fringes such as would occur in an interferometer. The interferometer fringes may be optically projected so that the distance between them is greater than that required for a pair of slits through which the light falls on two phototubes. Actually, a twin phototube having two closely spaced cathodes is used and the slits are thus able to be close together. The fringes are indicated by the numeral 50 in Fig. 2. The light portions 51 extend between the fringes 50. The apertures or slits L and R are shown between two fringes 50 in Fig. 2. As the adjustable mirror of the interferometer (not shown) is moved during a measurement the fringes move in one direction or the other.

Referring to Fig. 1 the light passes through the slits L and R, which are close together, as shown in Fig. 2, and illuminates the phototubes 1 and 2. The anodes of both phototubes are connected through a resistor 21 to a source of B+ voltage. The voltage on the anodes of the phototubes may be stabilized by a resistor 19 and a voltage regulator tube 9 connected between the anodes of the phototubes and ground. The cathodes of the phototubes 1 and 2 are connected to the control grids of a pair of electron tubes 3 and 4, respectively. The control grids of tubes 3 and 4 are connected through a pair of resistors 11 and 12 to a source of negative voltage C—1. The anodes of tubes 3 and 4 are connected through resistors 13 and 14, respectively, to the source of anode voltage b+ and also to the anodes of electron tubes 5 and 6. The cathodes of tubes 5 and 6 are grounded through a resistor 56. The anode of tube 5 is connected to ground through resistors 15 and 25 while the anode of tube 6 is connected to ground through resistors 16 and 26. The control grid of tube 5 is connected to the junction of resistors 16 and 26, while the control grid of tube 6 is connected to the junction of resistors 15 and 25. Thus tubes 5 and 6 are connected to form a flip-flop or Ecoles-Jordan trigger circuit.

The output of tube 5 is fed to the control grid of tube 7 through a condenser 57 while the output of tube 6 is fed to the control grid of tube 8 through a condenser 68. Control grids of tubes 7 and 8 are connected through resistors 27 and 28 to a source of negative voltage C—2 which is sufficiently high to bias tubes 7 and 8 beyond cutoff. The anodes of tubes 7 and 8 are connected through load resistors 17 and 18, respectively, to the source of b+ voltage. The outputs of tubes 7 and 8 are fed through condensers 37 and 38, respectively, to electronic counters 10. The electronic counters 10 may consist of two pulse counters for separately counting the output of tubes 7 and 8. Alternatively, the electronic counter may be a differential counter which subtracts the number of pulses from the tube 7, say, from the number of pulses from tube 8. An example of an electronic counter of the first type is RCA Decade Counter Model WF99B. A differential counter has been described by Victor H. Regener in the Review of Scientific Instruments, October 1946, and by Raymond M. Wilmotte in a co-pending application.

The operation of the circuit of Fig. 1 will be explained with reference to Figs. 2 and 3. The illumination of phototube 1 increases the potential on the control grid of tube 3, overcoming the bias C—1 and increasing the plate current. The illumination of phototube 2 has a similar effect on tube 4. Fig. 2 shows the phototube currents $1Ip$ and $2Ip$ resulting from the movement of the fringe pattern 50, 51 from right to left. When both slits L and R are illuminated as in Fig. 3, position A, the circuit is in the following condition:

$3Eg$ and $4Eg$ are high
$3Ip$ and $4Ip$ are high
$3Ep$ and $4Ep$ are low
$5Ip$ and $6Ip$ are low When the fringes have moved into position B, Fig. 3, in which the slit R is partly within a fringe, the circuit is in the following condition:

$4Eg$ and $4Ip$ are reduced
$4Ep$ and $6Ep$ are increased
$5Eg$ is increased

As phototube 2 becomes more fully shaded and phototube 1 becomes partly shaded by continued movement of the fringes toward the left $5Eg$ becomes high while $3Ip$ decreases. As a consequence $5Ip > 6Ip$. In position C of Fig. 3 the following conditions prevail:

$5Ip > 6Ip$
$5Ep < 6Ep$
$5Eg > 6Eg$

These conditions of position C constitute one of the usual two stable states of the flip-flop circuit. It is important to note that this stable state has been attained from position A without producing a countable pulse. This means the flip-flop circuit can be repeatedly triggered into one of its stable states without being triggered into its other stable state. As the fringes proceed to position D of Fig. 3 the following circuit conditions prevail:

$6Ep$ and $5Eg$ are reduced
$6Eg$ is high
$Ec$ is reduced $Ec$ is the voltage across resistor 56. When the slit R becomes about one third illuminated, in one specific embodiment of my invention, there is a sudden change in the currents; $6Ip$ becoming much larger than $5Ip$. Upon the occurrence of this changeover, a large positive pulse is produced through the condenser 57 and impressed on the control grid of tube 7 while a coincidental negative pulse is impressed on the control grid of tube 8. Since the control grids of tubes 7 and 8 are biased beyond cut-off, tube 8 is unaffected by the negative pulse, while tube 7 transmits a negative pulse through condenser 37 to the electronic counters 10.

If the fringes continue to proceed from right to left after reaching position D they will again pass through positions A, B and C and again produce a countable pulse at about a position corresponding to D in Fig. 3. If however just before producing a count the fringes reverse their travel no pulse will be produced in proceeding through positions C, B, and A. The conditions just after the changeover following position D are the reverse of those at position B. If just after the changeover the direction of travel of the fringes is reversed another changeover will occur and a positive pulse will be produced through condenser 68, cancelling the previous count. Also no countable pulse would be produced by the motion of fringes from positions A to B to A. It might be supposed that a positive pulse might be produced through condenser 68 at position B if the motion from A to B were very rapid. However the changeover at D is extremely rapid and the circuit can be so adjusted that positive pulses at position B are small compared to those at D even at very high rates of travel, so that no counting occurs at B. During extensive tests of the embodiment of my invention described herein it was not possible to produce a false count.

If the counter 10 should be of the type requiring a positive pulse for a positive count and a negative pulse for a negative count then a load resistor is connected between the cathode of tube 7 and ground and the condenser 37 is connected to this cathode instead of the anode of tube 7. Any other suitable means for inverting the polarity of one or both of the output pulses may be used to obtain the polarities required by the counter 10. I have also used the circuit of Fig. 1 with resistors between the cathodes of tubes 7 and 8 and ground.

While the invention has so far been described particularly with reference to an interference fringe pattern it will be obvious that my invention is also applicable to trains of travelling waves of energy of other types. It is only necessary to use the proper probes and energy responsive devices in place of the slits and phototubes of Fig. 1. For a traveling pressure or sound wave, for example, the probes might consist of hollow tubes and the phototubes would be replaced by microphones.

In Fig. 4 is shown a modification of my invention adaptable to traveling electrical waves. The waves may be traveling on a transmission line 30 and are picked up by taps or probes 31 and 41 spaced less than a pulse width or a half wavelength apart on the line 30. The tap 31 is connected to a pulse shaping circuit 33 through a condenser 32. Tap 41 is similarly connected through condenser 42 to pulse shaping circuits 43. The circuits 33 and 43 may convert the potentials picked up by the taps 31 and 41 into waves similar to $1Ip$ and $2Ip$ of Fig. 2. These potentials are impressed across resistors 11 and 12 and on the control grids of tubes 3 and 4 in the same manner as in Fig. 1. The remainder of the circuit is the same as that of Fig. 1. It is obvious that the electric pulses impressed on the control grids of tubes 3 and 4 will be counted in the same manner as in Fig. 1.

The invention is not limited to traveling waves or pulses. My circuit can be used for any sequence of potentials which are impressed on the grids of tubes 3 and 4 with a phase difference. The phase difference may be due to the spacing of the probes 31 and 41 or due to the fact that the trains of waves impressed on the probes have a phase displacement. If the phase displacement on the probes has one sense the trigger or flip-flop circuit is cocked into one stable state, without producing a countable pulse, and then flipped into the other stable state to produce a countable pulse; while if the phase displacement of the potentials on probes 31 and 32 or the grids of tubes 3 and 4 has the opposite sense the trigger circuit is cocked into its other state, without producing a countable pulse, and then is flopped or triggered into its first state to produce a countable pulse.

In a specific embodiment of the circuit shown in Fig. 1 the following circuit elements are used.

Tubes:
1 and 2 are an RCA type 920 twin phototube.
3 and 4, 5 and 6, 7 and 8 are 6SN7 tubes.
9 is a 0.1 watt neon lamp.

Resistors:
13, 14, 17, 18, 19, 25 and 26 are 47 kilohms.
21, 15, 16, 27 and 28 are 250 kilohms.
56 is 5.6 kilohms.
11 and 12 are 2.2 megohms.

Condensers:
37, 38, 57, 68 are 0.01 mfd.

B+ is regulated 255 volt source.

C—1 and C—2 are taps on a regulated −45 volt supply.

While I have described specific embodiments and applications of my invention it will be apparent to those skilled in the art that many other variations and applications of my invention can be made within the scope of my invention as defined by the claims.

1. A differential light fringe detector comprising a pair of phototubes, a first circuit, a second circuit, means for causing said phototubes to produce a single predetermined pulse in the first circuit upon the passing of each fringe over said phototubes in one direction and to produce a single predetermined pulse in the second circuit upon the passing of each fringe in the opposite direction.

2. A differential light fringe counter comprising a pair of phototubes, a first circuit, a second circuit, means for causing said phototubes to produce a predetermined pulse in the first circuit upon the passing of a fringe over said phototubes in one direction and to produce a predetermined pulse in the second circuit upon the passing of a fringe in the opposite direction, and means for counting the predetermined pulses in the first and second circuits selectively.

3. Apparatus for differentially detecting the direction of travel of wave energy, comprising a plurality of closely spaced probes, an energy responsive device connected to each of said probes, electrical pulse generating circuits connected to said devices for producing a first predetermined pulse in response to the passage of each wave over said probes in one direction and a second predetermined pulse in response to the passage of each wave over said probes in the opposite direction.

4. The apparatus described in claim 1 including means for differentially counting said first and second predetermined pulses.

5. Apparatus for counting energy pulses traveling in each of two directions comprising a pair of probes spaced apart a distance less than the width of said pulses, means for impressing said pulses on said probes, a first circuit, a second circuit, means for causing said probes to produce a predetermined pulse in the first circuit upon the passing of a pulse over said probes in one direction and to produce a predetermined pulse in the second circuit upon the passing of a pulse in the opposite direction, and means for counting the predetermined pulses in the first and second circuits selectively.

6. A differential fringe detector comprising a pair of phototubes, a light shield for said phototubes having an aperture for admitting light to each tube, the said apertures having a combined spacing and width which is less than the width of the fringes to be counted, a pair of electron tube amplifiers each having a control grid connected to the cathode of one of the phototubes, a flip-flop circuit including a pair of electron tubes each having its anode directly connected to the anode of one of the amplifier electron tubes, a pair of electron tube pulse amplifiers having control grid biases sufficient to produce anode current cutoff, and means for coupling the control grid of each of the pulse amplifiers to the anode of one of the electron tubes of the flip-flop circuit.

7. A differential counter of traveling light pulses comprising a pair of phototubes, said phototubes being positioned so that one phototube is illuminated by a portion of a light pulse before the other phototube is illuminated by the same light pulse, a pair of electron tube amplifiers each having a control grid connected to the cathode of one of the phototubes, a flip-flop circuit including a pair of electron tubes each having its anode directly connected to the anode of one of the amplifier electron tubes, a pair of electron tube pulse amplifiers having control grid biases sufficient to produce anode current cutoff, means for coupling the control grid of each of the pulse amplifiers to the anode of one of the electron tubes of the flip-flop circuit, a differential pulse counter, means for feeding the output of each of the pulse amplifiers to the pulse counter.

8. A differential detector of traveling light pulses comprising a pair of phototubes, said phototubes being positioned so that one is illuminated by a portion of a light pulse before the other phototube is illuminated by the same pulse, a pair of amplifiers, each of said amplifiers being connected to one of the phototubes, a flip-flop circuit including a pair of electron tubes, means for impressing the output of each amplifier on one of said electron tubes, a pair of electron tube pulse amplifiers having control grid biases sufficient to produce anode current cutoff, and means for coupling the control grid of each of the pulse amplifiers to the anode of one of the electron tubes of the flip-flop circuit.

9. The apparatus described in claim 8 including a differential pulse counter, and means for differentially feeding the output of each of the pulse amplifiers to the differential counter.

10. An electron tube circuit comprising a pair of electron tubes having control grids, cathodes and anodes, means for impressing a potential on each control grid, a source of positive potential, an impedance connected between each anode and said source, a second pair of electron tubes each having an anode connected to one of the anodes of the first mentioned tubes, an impedance connected between each anode of the second pair of tubes and ground, each of said second pair of tubes having a control grid coupled to the anode of the other of said pair of tubes, said circuits having parameters so dimensioned that one of said second pair of tubes can be repeatedly suddenly triggered into a condition of high anode current without suddenly triggering the other of said second pair of tubes into a condition of similarly high anode current.

11. Electronic apparatus comprising an electron tube circuit having two stable electrical states, control circuits for differentially controlling the potentials of said electron tube circuit, means for applying control potentials to said control circuits, and means in said electron tube circuit and said control circuits for repeatedly suddenly triggering said electron tube circuit into one of its stable states without suddenly triggering said electron tube circuit into its other stable state.

12. In combination, an electronic trigger circuit having a first and second output connection, a control circuit for said trigger circuit connected to the trigger circuit and having two input connections, means for impressing phase displaced trains of waves on said two input connections, and means in said control circuit for triggering said trigger circuit to produce a predetermined pulse in response to each wave only at the first output connection when the phase displacement has one sense and to produce a predetermined pulse in response to each wave only at the second output connection when said phase displacement has the opposite sense.

LARRY L. YOUNG.

No references cited.